US010625792B2

(12) United States Patent
Shiga et al.

(10) Patent No.: US 10,625,792 B2
(45) Date of Patent: Apr. 21, 2020

(54) MOVABLE FRONT SPOILER DEVICE

(71) Applicant: AISIN SEIKI KABUSHIKI KAISHA, Kariya-shi, Aichi-ken (JP)

(72) Inventors: Tokuhiro Shiga, Obu (JP); Yukihide Shibutani, Nagoya (JP); Hideki Mizuno, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 16 days.

(21) Appl. No.: 16/166,205

(22) Filed: Oct. 22, 2018

(65) Prior Publication Data
US 2019/0118872 A1    Apr. 25, 2019

(30) Foreign Application Priority Data
Oct. 24, 2017 (JP) ................................. 2017-205135

(51) Int. Cl.
*B62D 35/00* (2006.01)
*B62D 37/02* (2006.01)

(52) U.S. Cl.
CPC .......... *B62D 35/005* (2013.01); *B62D 37/02* (2013.01)

(58) Field of Classification Search
CPC ............................ B62D 35/005; B62D 37/02
USPC ....................................................... 296/180.5
See application file for complete search history.

(56) References Cited

U.S. PATENT DOCUMENTS

| 2011/0049913 | A1* | 3/2011  | Bernt .................... B60R 19/48 293/102 |
| 2017/0120968 | A1  | 5/2017  | Povinelli et al. |
| 2017/0151984 | A1* | 6/2017  | Bray .................... B62D 35/005 |
| 2018/0162459 | A1* | 6/2018  | Abdoul Azizou ..... B62D 37/02 |
| 2019/0039663 | A1* | 2/2019  | Bray .................... B60T 17/22 |
| 2019/0152543 | A1* | 5/2019  | Shiga ................... B62D 37/02 |
| 2019/0248429 | A1* | 8/2019  | Parra .................... B62D 35/005 |
| 2019/0382060 | A1* | 12/2019 | Povinelli ............... B62D 37/02 |

FOREIGN PATENT DOCUMENTS

| CN | 106536334    A  |   | 3/2017  |                  |
| FR |   3012107   A1 | * | 4/2015  | ........ B62D 35/005 |
| JP |  362085770   A | * | 4/1987  | .......... B62D 37/02 |
| JP |   03042381   A | * | 2/1991  | .......... B62D 37/02 |
| JP |  H06227444   A |   | 8/1994  |                  |
| WO | 2015191697   A2 |   | 12/2015 |                  |

* cited by examiner

*Primary Examiner* — Jason S Morrow
(74) *Attorney, Agent, or Firm* — Buchanan Ingersoll & Rooney PC

(57) ABSTRACT

A movable front spoiler device includes: an actuator including a rotation shaft provided so as to be rotatable forwardly and reversely; a link mechanism connected to the rotation shaft of the actuator; a spoiler connected to the link mechanism and provided so as to be pivotable between a deployed position and a retract position; and a spring attached to the spoiler and configured to bias the spoiler in a pivot direction in which the spoiler pivots toward the deployed position in which the spoiler pivots toward the deployed position when the rotation shaft of the actuator rotates forwardly, and pivots toward the retract position when the rotation shaft of the actuator rotates reversely, and the actuator is provided such that the rotation shaft is rotatable reversely by an external force applied to the spoiler in a pivot direction in which the spoiler pivots toward the retract position.

4 Claims, 6 Drawing Sheets

MOVABLE FRONT SPOILER DEVICE

CROSS REFERENCE TO RELATED APPLICATIONS

This application is based on and claims priority under 35 U.S.C. § 119 to Japanese Patent Application 2017-205135, filed on Oct. 24, 2017, the entire contents of which are incorporated herein by reference.

TECHNICAL FIELD

This disclosure relates to a movable front spoiler device.

BACKGROUND DISCUSSION

As related-art documents that disclose a configuration of a movable front spoiler device, there are WO 2015/191697A (Reference 1) and JP 06-227444A (Reference 2).

An active front deflector described in Reference 1 includes a deflector, a link mechanism, and an actuator. The actuator includes a deceleration mechanism unit. Due to the deceleration mechanism unit, the actuator is difficult to rotate in reverse. The actuator has a clutch structure in which driving transmission is disconnected upon receiving a load exceeding a threshold. In the clutch structure, engaging surfaces of teeth engaged with each other are inclined surfaces, and when teeth at one side ride on the inclined surfaces of the teeth at the other side, the engagement between the teeth is released and driving transmission is disconnected.

A front spoiler device described in Reference 2 includes a spoiler, a frame, an arm, a link, and an actuator. The link has an elastically deformable perforated structure.

The active front deflector described in Reference 1 is configured such that the engagement between the teeth is released by bringing the inclined surfaces of the teeth into sliding contact with each other. However, the frictional resistance between the inclined surfaces vary due to factors such as, for example, the outside air temperature or adhesion of dust to the inclined surfaces, so that the threshold of the load varies when driving transmission is disconnected. As a result, an overload may act on the deflector, thereby causing damage to the deflector.

In the front spoiler device described in Reference 2, the load acting on the spoiler is reduced by elastically deforming the link, but it is necessary to secure both the amount of elastic deformation of the link and the rigidity of the link. Therefore, when it is impossible to secure a sufficient amount of elastic deformation of the spoiler, an overload may act on the spoiler, thereby causing damage to the spoiler.

Thus, a need exists for a movable front spoiler device which is not susceptible to the drawback mentioned above.

SUMMARY

A movable front spoiler device according to an aspect of this disclosure includes an actuator, a link mechanism, a spoiler, and a spring. The actuator includes a rotation shaft, provided so as to be rotatable forwardly and reversely. The link mechanism is connected to the rotation shaft of the actuator. The spoiler is connected to the link mechanism. The spoiler is provided so as to be pivotable between a deployed position and a retract position. The spring is attached to the spoiler. The spring is configured to bias the spoiler in a pivot direction in which the spoiler pivots toward the deployed position. The spoiler pivots toward the deployed position when the rotation shaft of the actuator rotates forwardly, and pivots toward the retract position when the rotation shaft of the actuator rotates reversely. The actuator is provided such that the rotation shaft is rotatable reversely by an external force applied to the spoiler in a pivot direction in which the spoiler pivots toward the retract position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
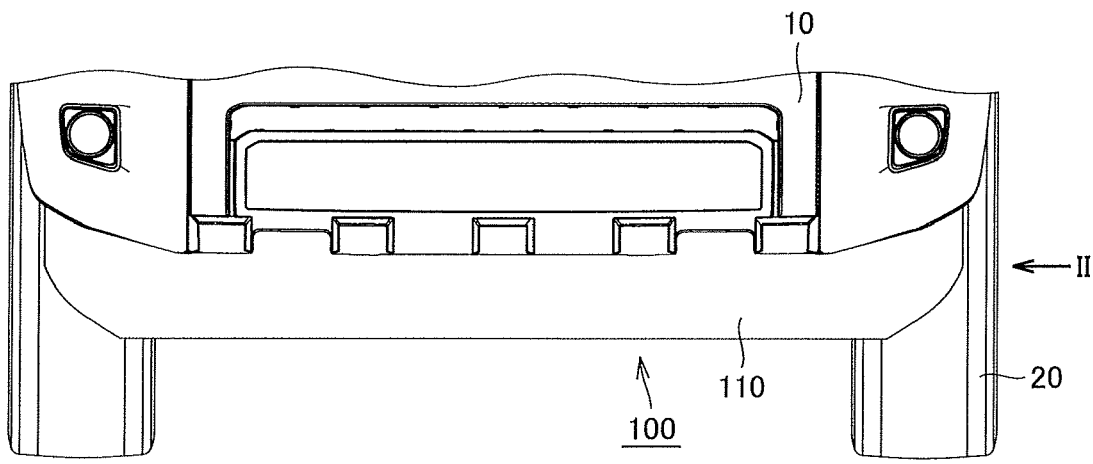
FIG. 1 is a front view of a deployed state of a movable front spoiler device according to an embodiment disclosed here as viewed from the front side of a vehicle.

Hereinafter, a movable front spoiler device according to an embodiment disclosed here will be described with reference to the accompanying drawings. In the following description, the same or corresponding parts in the drawings will be denoted by the same reference numerals, and a description thereof will not be repeated.

Figure 2:
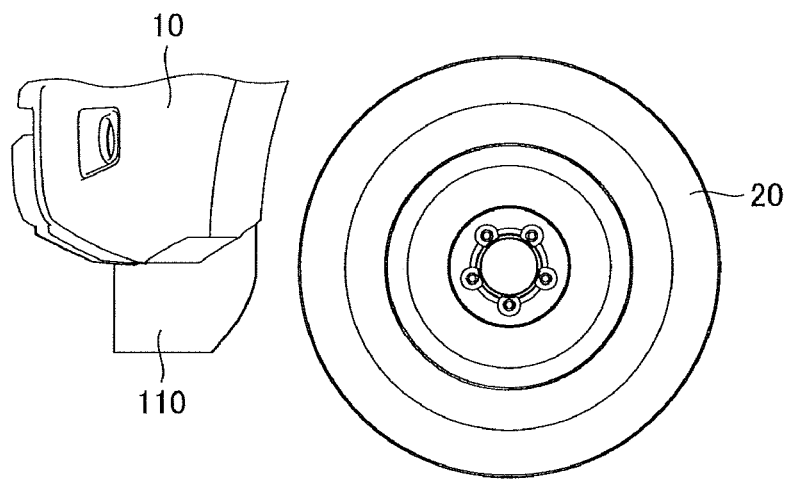
FIG. 2 is a side view of the vehicle of FIG. 1 as viewed in the direction of arrow II.
Figure 3:
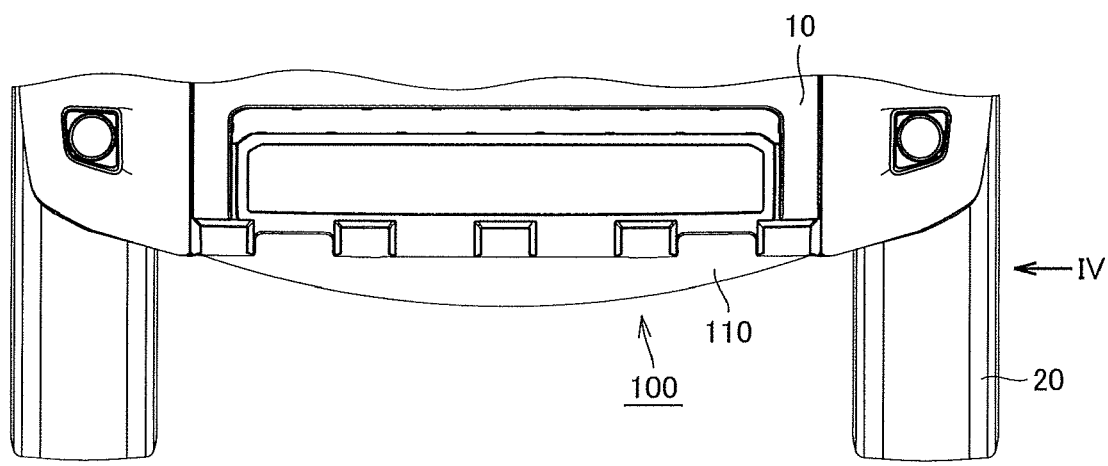
FIG. 3 is a front view of a retract state of the movable front spoiler device according to the embodiment disclosed here as viewed from the front side of the vehicle.
Figure 4:
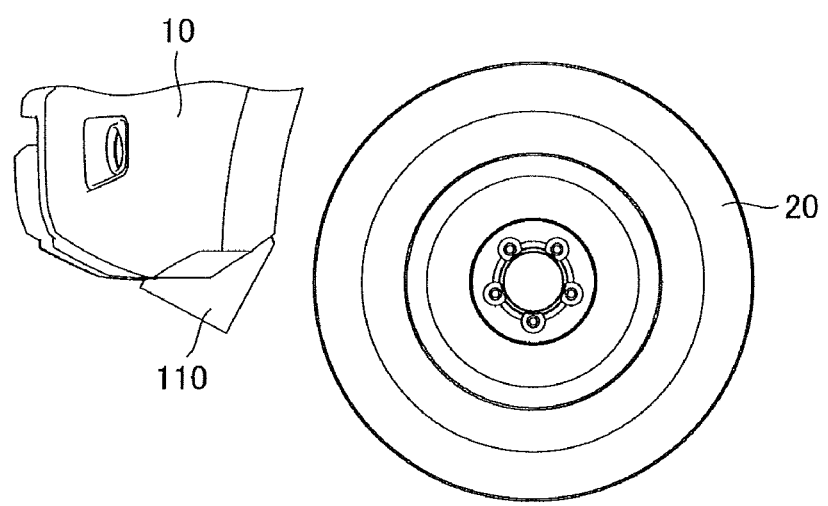
FIG. 4 is a side view of the vehicle of FIG. 3 as viewed in the direction of arrow IV.

FIG. 1 is a front view of a deployed state of a movable front spoiler device according to an embodiment disclosed here as viewed from the front side of a vehicle. FIG. 2 is a side view of the vehicle of FIG. 1 as viewed in the direction of arrow II. FIG. 3 is a front view of a retract state of the movable front spoiler device according to the embodiment disclosed here as viewed from the front side of the vehicle. FIG. 4 is a side view of the vehicle of FIG. 3 as viewed in the direction of arrow IV.

As illustrated in FIGS. 1 to 4, the movable front spoiler device 100 according to the embodiment disclosed here includes a spoiler 110. The spoiler 110 is disposed under a bumper 10 provided on the front side of the vehicle from the front position of one front wheel 20 to the front position of the other front wheel 20.

The movable front spoiler device 100 causes the spoiler 110 to pivot between a retract position where the spoiler 110 is stored inside the vehicle such that air resistance is reduced during running of the vehicle and a deployed position where the spoiler 110 is deployed to the lower side of the vehicle from the retract position.

The spoiler 110 includes a front portion and both side portions. At the deployed position, all of the front portion and both side portions of the spoiler 110 are substantially vertically oriented. At the retract position, the front portion obliquely faces the ground.

Figure 5:
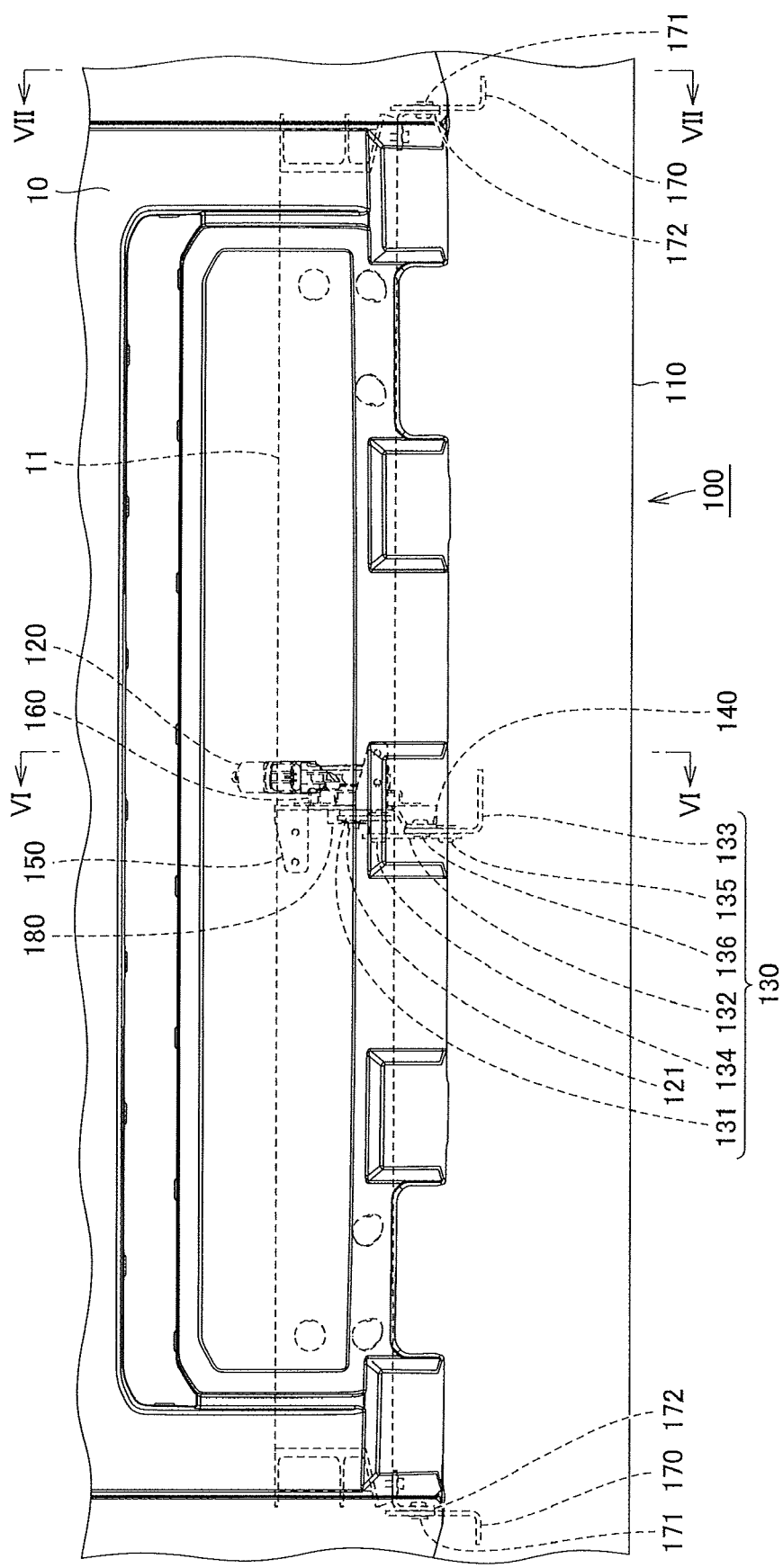
FIG. 5 is a front view illustrating a configuration of the movable front spoiler device according to the embodiment disclosed here.
Figure 6:
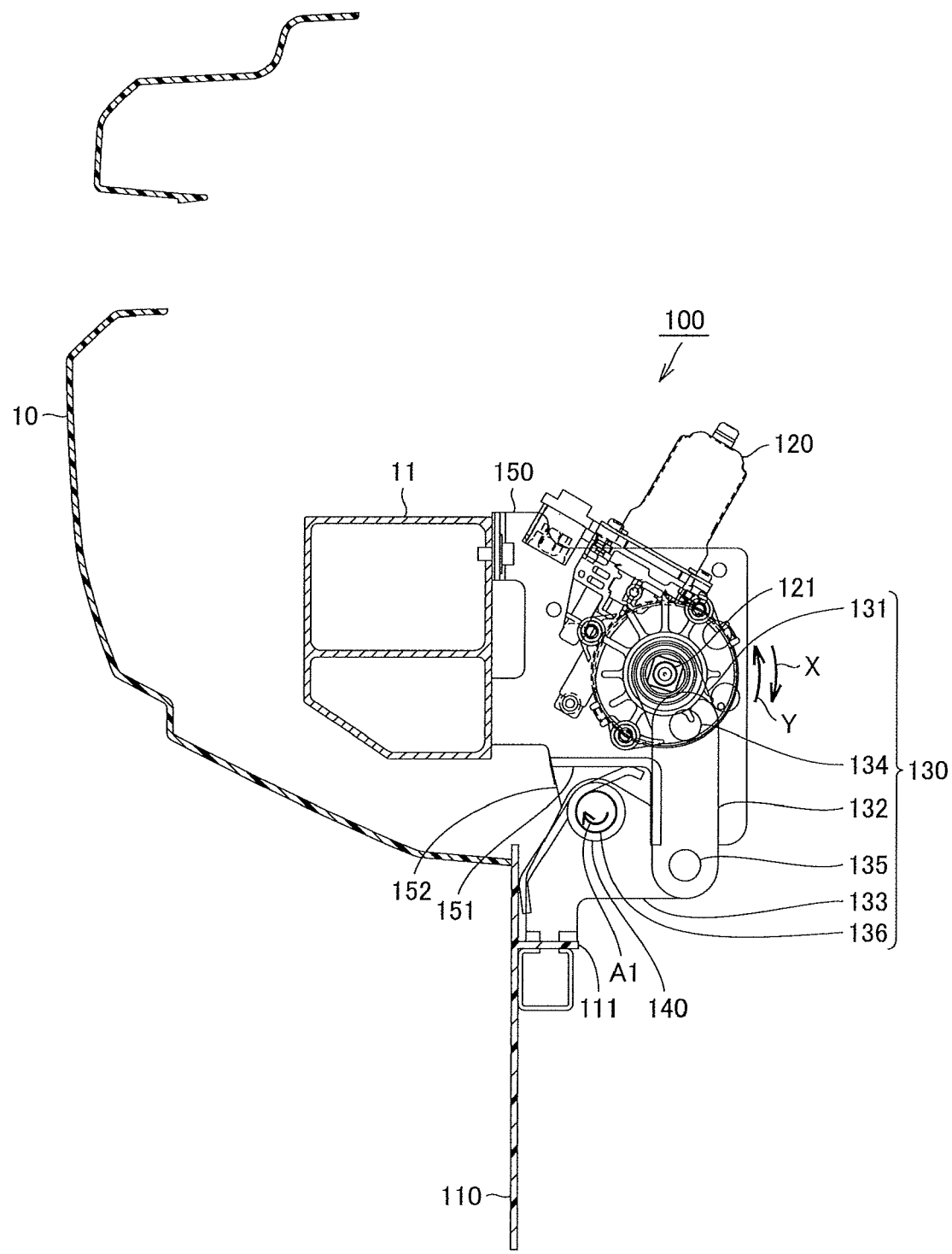
FIG. 6 is a cross-sectional view of the movable front spoiler device of FIG. 5 taken along line VI-VI.
Figure 7:
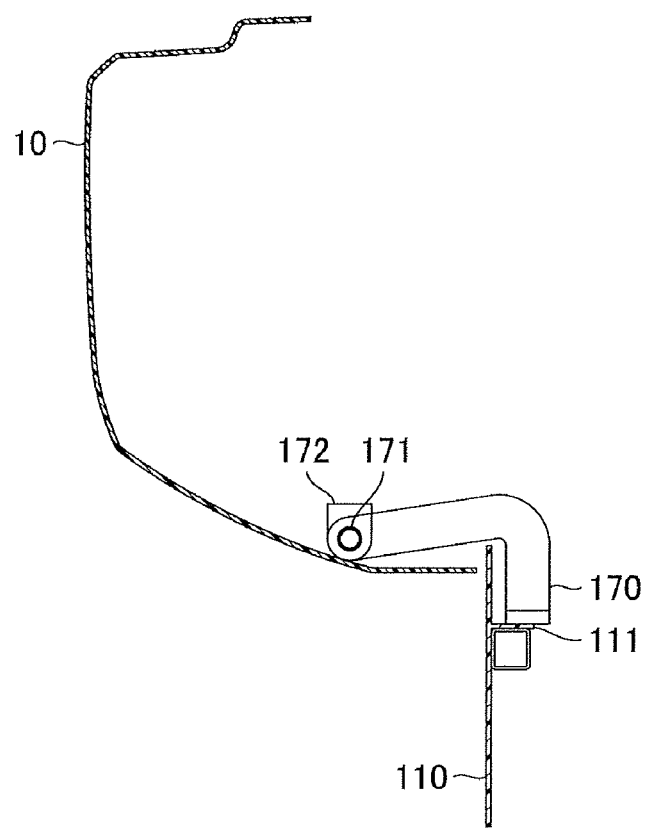
FIG. 7 is a cross-sectional view of the movable front spoiler device of FIG. 5 taken along line VII-VII.

FIG. 5 is a front view illustrating a configuration of the movable front spoiler device according to the embodiment disclosed here. FIG. 6 is a cross-sectional view of the movable front spoiler device of FIG. 5 taken along line VI-VI. FIG. 7 is a cross-sectional view of the movable front spoiler device of FIG. 5 taken along line VII-VII. FIGS. 5 to 7 illustrate the deployed state of the movable front spoiler device 100. FIGS. 6 and 7 illustrate a portion of the configuration in perspective.

Figure 8:
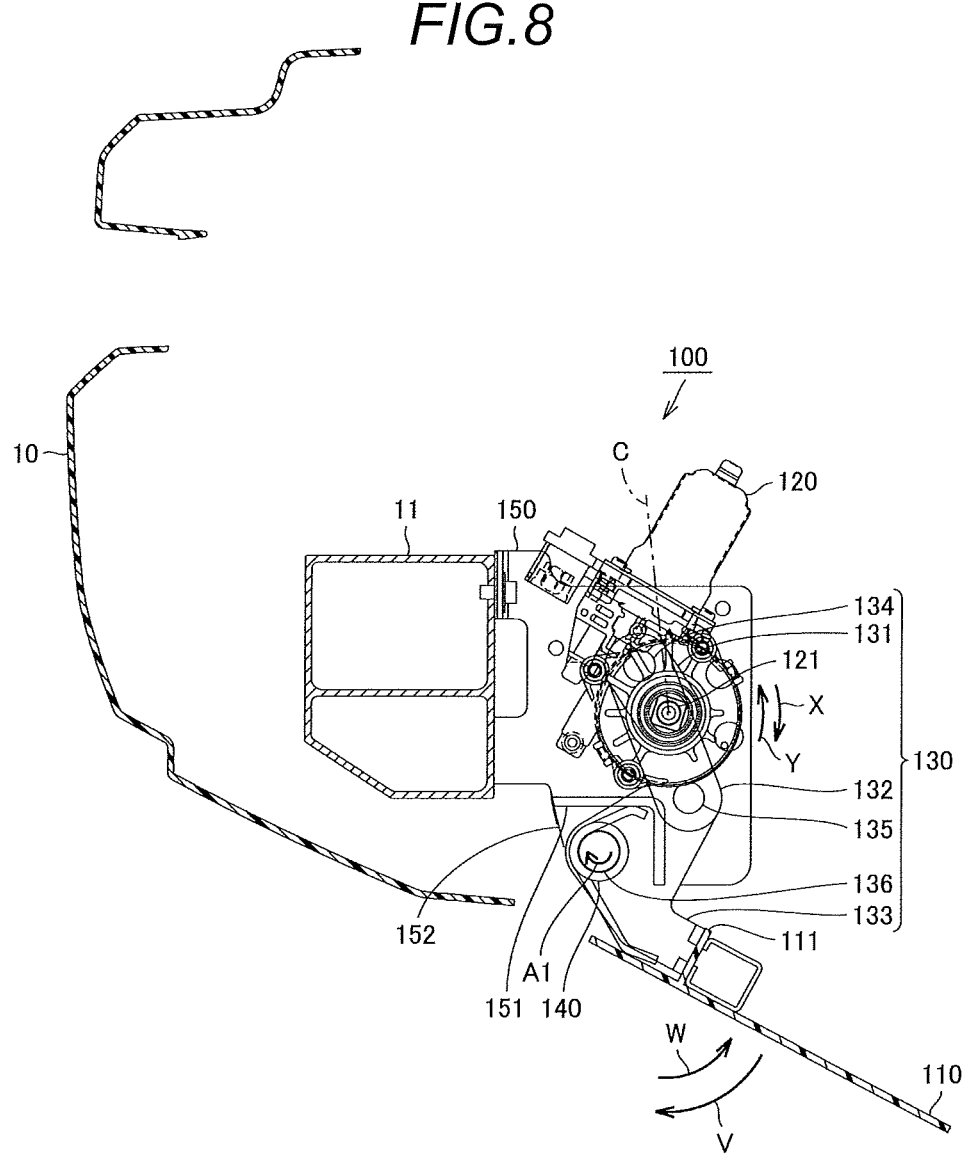
FIG. 8 is a cross-sectional view illustrating the retract state of the movable front spoiler device according to the embodiment disclosed here as viewed in the same cross-section as in FIG. 6.
Figure 9:
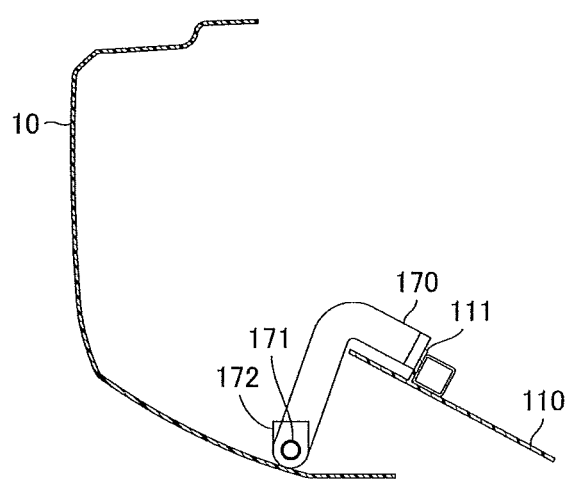
FIG. 9 is a cross-sectional view illustrating the retract state of the movable front spoiler device according to the embodiment disclosed here as viewed in the same cross-section as in FIG. 7.

FIG. 8 is a cross-sectional view illustrating the retract state of the movable front spoiler device according to the embodiment disclosed here as viewed in the same cross-section as in FIG. 6. FIG. 9 is a cross-sectional view illustrating the retract state of the movable front spoiler device according to the embodiment disclosed here as viewed in the same cross-section as in FIG. 7. FIGS. 8 and 9 illustrate a portion of the configuration in perspective.

As illustrated in FIGS. 5 to 9, the movable front spoiler device 100 according to the embodiment disclosed here is assembled to a mounting bracket 150. The mounting bracket 150 is fastened to a front member 11 of the vehicle with a bolt. The front member 11 is a metal member that extends in the width direction of the vehicle.

The mounting bracket 150 is a metal member. The mounting bracket 150 includes a horizontal portion 151 to which one end of a spring 140 to be described later is attached and which extends substantially horizontally along the width direction of the vehicle and a vertical portion 152 from which a pivot shaft 136 to be described later protrudes and which extends substantially perpendicular to the width direction of the vehicle. A locking member 180, which is capable of being engaged with a link mechanism 130 to be described later by coming into contact with the link mechanism 130 is attached to the mounting bracket 150. The locking member 180 is formed of a metal, a resin, rubber, or a composite material including any one of these materials.

The movable front spoiler device 100 further includes an actuator 120, a link mechanism 130, and a spring 140. The actuator 120 is connected to the mounting bracket 150 via an attachment 160. The actuator 120 includes an electric motor and a deceleration mechanism.

The actuator 120 includes a rotation shaft 121, and the rotation shaft 121 is provided so as to be rotatable forwardly in the X direction and reversely in the Y direction. The drive force of the electric motor drives the rotation shaft 121 via the deceleration mechanism. When the electric motor is not operated, the rotation shaft 121 is rotatably connected to the electric motor via the deceleration mechanism.

The link mechanism 130 is connected to the rotation shaft 121 of the actuator 120. In the present embodiment, the link mechanism 130 includes a first link 131, a second link 132, a third link 133, a first connection shaft 134, a second connection shaft 135, and a pivot shaft 136.

The first link 131 is connected to the rotation shaft 121 and pivots about the rotation shaft 121. The first link 131 is relatively pivotably connected to the second link 132 by the first connection shaft 134. The second link 132 is relatively pivotably connected to the third link 133 by the second connection shaft 135.

The third link 133 is relatively pivotably connected to the vertical portion 152 of the mounting bracket 150 by the pivot shaft 136. The third link 133 is connected to a mounting part 111, which is erected from the rear surface of the front portion of the spoiler 110, with a bolt. A reinforcement member connected to the rear surface of the front portion is provided on the side of the mounting part 111 opposite to the side fixed to the third link 133.

The spring 140 is coaxially disposed around the pivot shaft 136. The spring 140 is a torsion spring. One end of the spring 140 is attached to the horizontal portion 151 of the mounting bracket 150, and the other end of the spring 140 is attached to the rear surface of the front portion of the spoiler 110.

Thus, a biasing force in the direction of arrow A1 is continuously applied to the third link 133 around the pivot shaft 136. As a result, the spoiler 110 is continuously biased by the spring 140 in a pivot direction toward the deployed position (V direction).

As described above, the spoiler 110 is connected to the link mechanism 130. The spoiler 110 is provided so as to be pivotable between the deployed position and the retract position. The spoiler 110 pivots toward the deployed position when the rotation shaft 121 of the actuator 120 rotates forwardly in the X direction, and pivots toward the retract position when the rotation shaft 121 of the actuator 120 rotates reversely in the Y direction.

The movable front spoiler device 100 further includes two driven links 170. The two driven links 170 are connected to the spoiler 110 and pivot together with the spoiler 110. Specifically, each of the two driven links 170 has one end connected to the mounting part 111 of the spoiler 110 and the other end relatively pivotably connected to a support member 172 by a connecting pin 171. The support member 172 is connected to the lower portion of the end of the front member 11 in the width direction of the vehicle.

The two driven links 170 are arranged so that the link mechanism 130 is located between the two driven links 170 in the width direction of the spoiler 110 which corresponds to the width direction of the vehicle. The link mechanism 130 is provided in a central portion in the width direction of the spoiler 110.

Hereinafter, an operation of the movable front spoiler device 100 according to the embodiment disclosed here will be described. As illustrated in FIGS. 5 to 7, when the movable front spoiler device 100 is in the deployed state, the rotation shaft 121 of the actuator 120 rotates forwardly in the X direction, so that the spoiler 110 pivots about the pivot shaft 136 via the link mechanism 130 and is disposed at the deployed position. When the spoiler 110 is at the deployed position, the spoiler 110 is biased by the spring 140 in the pivot direction toward the deployed position (V direction), and the driving of the actuator 120 is stopped.

As illustrated in FIGS. 8 and 9, when the movable front spoiler device 100 is in the retract state, the rotation shaft 121 of the actuator 120 rotates reversely in the Y direction, so that the spoiler 110 pivots about the pivot shaft 136 via the link mechanism 130 while resisting the biasing force of the spring 140, and is disposed at the retract position.

When the spoiler 110 is at the retract position, the link mechanism 130 is brought into contact with and is locked by the locking member 180 illustrated in FIG. 5 at a position beyond a dead point C in the reverse rotation direction (Y direction) of the rotation shaft 121, and the driving of the actuator 120 is stopped.

Specifically, at the position where the first connection shaft 134 passes by the dead point C in the reverse rotation direction (Y direction) of the rotation shaft 121, the biasing force of the spring 140 acts on the first link 131 in the direction in which the first link 131 pivots in the reverse rotation direction (Y direction). Since the first link 131 is brought into contact with and is locked by the locking member 180, the spoiler 110 is held at the retract position in a state where the driving of the actuator 120 is stopped.

As described above, the spoiler 110 pivots between the deployed position and the retract position. When the spoiler 110 is at the deployed position, the rotation shaft 121 is freely rotatably held because the driving of the actuator 120 is stopped.

Therefore, in a case where the spoiler 110 comes into contact with, for example, an interfering object at the deployed position and an external force is applied to the spoiler 110 in a pivot direction toward the retract position (W direction), the external force acts on the rotation shaft 121 through the link mechanism 130, so that the rotation shaft 121 rotates in the reverse rotation direction (Y direction). Thus, when the external force is greater than the biasing force of the spring 140, the spoiler 110 pivots in the pivot direction toward the retract position (W direction) while resisting the biasing force of the spring 140. As a result, only a load corresponding to the biasing force of the spring 140 acts on the spoiler 110. Therefore, it is possible to stably prevent an overload from acting on the spoiler 110.

In the present embodiment, since the driving of the actuator 120 is stopped when the spoiler 110 is at the deployed position and at the retract position, power saving of the movable front spoiler device 100 may be achieved.

In addition, since the movable front spoiler device 100 according to the present embodiment may prevent an overload from acting on the spoiler 110 without using a complicated mechanism, it is possible to reduce the size and cost of the movable front spoiler device 100. In addition, the link mechanism 130 is not limited to the above configuration, and may have any other configuration as long as it may rotate the spoiler 110 to the deployed position and the retract position so as to hold the spoiler 110 at the deployed position and the retract position.

In the movable front spoiler device 100 according to the present embodiment, the two driven links 170 are arranged such that the link mechanism 130 is located between the two driven links 170 in the width direction of the spoiler 110. Therefore, the spoiler 110 is smoothly rotatable to the deployed position and to the retract position.

A movable front spoiler device according to an aspect of this disclosure includes an actuator, a link mechanism, a spoiler, and a spring. The actuator includes a rotation shaft, provided so as to be rotatable forwardly and reversely. The link mechanism is connected to the rotation shaft of the actuator. The spoiler is connected to the link mechanism. The spoiler is provided so as to be pivotable between a deployed position and a retract position. The spring is attached to the spoiler. The spring is configured to bias the spoiler in a pivot direction in which the spoiler pivots toward the deployed position. The spoiler pivots toward the deployed position when the rotation shaft of the actuator rotates forwardly, and pivots toward the retract position when the rotation shaft of the actuator rotates reversely. The actuator is provided such that the rotation shaft is rotatable reversely by an external force applied to the spoiler in a pivot direction in which the spoiler pivots toward the retract position.

In the aspect of this disclosure, when the spoiler is at the retract position, the link mechanism may be brought into contact with and is locked by a locking member at a position beyond a dead point in a reverse rotation direction of the rotation shaft, and driving of the actuator is stopped.

In the aspect of this disclosure, the movable front spoiler device may further include two driven links. The two driven links may be connected to the spoiler so as to pivot together with the spoiler. The link mechanism may be provided in a central portion in a width direction of the spoiler. The two driven links may be arranged such that the link mechanism is located between the two driven links in the width direction of the spoiler.

According to the aspect of this disclosure, it is possible to stably prevent an overload from acting on a spoiler.

It should be considered that the embodiment disclosed here is given by way of example in all respects and is not restrictive. The scope of the disclosure is defined not by the above description but by the claims, and it is intended that all modifications are included within the meaning and scope equivalent to the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A movable front spoiler device comprising:
    an actuator including a rotation shaft provided so as to be rotatable forwardly and reversely;
    a link mechanism connected to the rotation shaft of the actuator;
    a spoiler connected to the link mechanism and provided so as to be pivotable between a deployed position and a retract position; and
    a spring attached to the spoiler and configured to bias the spoiler in a pivot direction in which the spoiler pivots toward the deployed position,
    wherein the spoiler pivots toward the deployed position when the rotation shaft of the actuator rotates forwardly, and pivots toward the retract position when the rotation shaft of the actuator rotates reversely, and
    the actuator is provided such that the rotation shaft is rotatable reversely by an external force applied to the spoiler in a pivot direction in which the spoiler pivots toward the retract position.

2. The device according to claim 1,
    wherein, when the spoiler is at the retract position, the link mechanism is brought into contact with and is locked by a locking member at a position beyond a dead point in a reverse rotation direction of the rotation shaft, and driving of the actuator is stopped.

3. The device according to claim 1, further comprising:
    two driven links connected to the spoiler so as to pivot together with the spoiler,
    wherein the link mechanism is provided in a central portion in a width direction of the spoiler, and
    the two driven links are arranged such that the link mechanism is located between the two driven links in the width direction of the spoiler.

4. The device according to claim 2, further comprising:
two driven links connected to the spoiler so as to pivot together with the spoiler,
wherein the link mechanism is provided in a central portion in a width direction of the spoiler, and
the two driven links are arranged such that the link mechanism is located between the two driven links in the width direction of the spoiler.

* * * * *